(12) United States Patent
Spatafora et al.

(10) Patent No.: US 7,941,992 B2
(45) Date of Patent: May 17, 2011

(54) METHOD AND UNIT FOR FEEDING PRODUCTS TO A GROUP-FORMING UNIT

(75) Inventors: Mario Spatafora, Granarolo (IT); Fabrizio Tale', Bologna (IT)

(73) Assignee: G.D Societa'per Azioni (IT)

( * ) Notice: Subject to any disclaimer, the term of this patent is extended or adjusted under 35 U.S.C. 154(b) by 231 days.

(21) Appl. No.: 12/206,861

(22) Filed: Sep. 9, 2008

(65) Prior Publication Data
US 2009/0120040 A1    May 14, 2009

(30) Foreign Application Priority Data
Sep. 13, 2007    (IT) .............................. BO2007A0622

(51) Int. Cl.
*B65B 35/56*    (2006.01)
*B65B 1/30*    (2006.01)
(52) U.S. Cl. ................ 53/446; 53/251; 53/253; 53/495; 198/460.1; 198/812
(58) Field of Classification Search .............. 53/57, 494, 53/495, 498, 251, 253, 442, 446; 198/469.1, 198/459.2, 478.1, 665, 460.1, 812
See application file for complete search history.

(56) References Cited

U.S. PATENT DOCUMENTS

| 3,751,873 | A | 8/1973 | Toby | |
|---|---|---|---|---|
| 4,680,919 | A * | 7/1987 | Hirama et al. | 53/499 |
| 7,225,601 | B2 * | 6/2007 | Spatafora | 53/542 |
| 7,341,141 | B2 * | 3/2008 | Spatafora | 198/460.2 |
| 7,555,881 | B2 * | 7/2009 | Spatafora et al. | 53/446 |

FOREIGN PATENT DOCUMENTS

| DE | 26 18 905 A1 | 11/1977 |
|---|---|---|
| EP | 1 721 844 | 11/2006 |
| EP | 1 721 844 A1 | 11/2006 |
| EP | 1 889 784 | 2/2008 |
| EP | 1 889 784 A1 | 2/2008 |

* cited by examiner

*Primary Examiner* — Thanh K Truong
(74) *Attorney, Agent, or Firm* — Ostrolenk Faber LLP

(57) ABSTRACT

A method and unit for feeding products to a group-forming unit for forming groups of products, each containing a given number of products; an orderly succession of products is fed in a first direction by means of a first conveyor; an orderly succession of products is fed in a second direction, parallel to the first direction, by means of a second conveyor parallel to the first conveyor; and the products are transferred from the first conveyor to the second conveyor by means of a transfer device which is permanently integral with an output end of the first conveyor, is moved in the second direction upon detection of a gap along the first conveyor, and is moved in the opposite direction to the second direction to form, along the second conveyor, a number of consecutive gaps equal to the number of products in each group of products.

5 Claims, 5 Drawing Sheets

METHOD AND UNIT FOR FEEDING PRODUCTS TO A GROUP-FORMING UNIT

The present invention relates to a method and unit for feeding products to a group-forming unit.

The present invention may be used to advantage for feeding packets of cigarettes from a cellophaning machine to a cartoning machine, to which the following description refers purely by way of example.

BACKGROUND OF THE INVENTION

Packets of cigarettes are normally fed from a cellophaning machine to a cartoning machine using a single pocket feed conveyor, which feeds the packets directly from the cellophaning machine to the cartoning machine in a single orderly succession, and constitutes both an output conveyor of the cellophaning machine and an input conveyor of the cartoning machine. This solution, on the one hand, has the obvious advantage of maintaining the timing of the two machines and, on the other, has the obvious drawback of allowing no compensation for any gaps, i.e. empty pockets, along the feed conveyor, and so preventing the formation of incomplete groups on the cartoning machine.

To compensate for gaps, it has been proposed to keep the output conveyor of the cellophaning machine and the input conveyor of the cartoning machine separate, and to interpose an interoperational (preferably FIFO) store between the two. The store is fed by the output conveyor of the cellophaning machine with a first orderly succession of packets of cigarettes in time with the cellophaning machine; the packets are brought together inside the store to form queues, are withdrawn from the queues in the store by the input conveyor of the cartoning machine, and are again arranged into a second succession in time with the cartoning machine. Any gaps along the output conveyor of the cellophaning machine are thus compensated for, but the two machines no longer operate in time with each other. Moreover, at relatively high production speeds, withdrawal of the packets from the queues in the store is not easy, and may result in damage to the packets.

Patent Application EP1721844A1 proposes a unit for feeding packets of cigarettes from a cellophaning machine to a cartoning machine. A first output pocket conveyor of the cellophaning machine and a second input pocket conveyor of the cartoning machine move continuously in respective opposite first and second directions, and are connected by a pocket transfer wheel interposed between the first and second conveyor. The pocket transfer conveyor rotates about an axis of rotation crosswise to the first and second conveyor; or translates, together with the second conveyor, crosswise to the axis of rotation to compensate one or more gaps on the first conveyor; or translates, together with the first conveyor, crosswise to the axis of rotation to form a succession of gaps, in time with the cartoning machine, on the second conveyor.

The feed unit described in Patent Application EP1721844A1, however, has several drawbacks, by failing to allow for optimum location of the heat-shrink devices necessary to obtain high-quality plastic overwrappings of the packets, and by failing to effectively handle sharp deceleration (or stoppage) of the cartoning machine, on account of the greater inertia of the cellophaning machine, which prevents the cellophaning machine from decelerating or stopping as fast as the cartoning machine. As a result, in the event of sharp deceleration (o stoppage) of the cartoning machine, a number of packets are invariably fed onto the output conveyor of the cellophaning machine, and, not being feedable to the cartoning machine, must be rejected.

Patent Application EP2007114457 proposes a unit for feeding packets of cigarettes to a cartoning machine which forms groups of packets. An orderly succession of packets is fed in a first direction by a first conveyor; the packets are transferred from the first conveyor to a second conveyor by a first transfer device, and an orderly succession of packets is fed in a second direction by the second conveyor; the packets are transferred from the second conveyor to a third conveyor by a second transfer device, and an orderly succession of packets is fed by the third conveyor in a third direction parallel to the second direction. When a gap is detected along the first transfer device, the second conveyor is stopped and, simultaneously, the second transfer device is moved in the second direction towards the first transfer device.

The feed unit described in Patent Application EP2007114457, however, has several drawbacks: it is fairly complicated mechanically, does not allow easy access to all the areas through which the packets travel, and is not always successful in handling sharp deceleration (or stoppage) of the cartoning machine.

Patent Application DE2618905A1 describes a unit for transferring single cigarettes between two conveyors, and for compensating for any difference in speed between the conveyors. A first output pocket conveyor and a second input pocket conveyor move continuously in respective parallel opposite first and second directions, and are connected by a pocket transfer drum interposed between the first and second conveyor and rotating about an axis of rotation crosswise to the first and second conveyor to transfer cigarettes between the two conveyors. In the event of a difference in speed between the two conveyors, the transfer drum translates in the first or second direction, together with one of the two conveyors.

Patent Application DE1124584A1 describes a unit for transferring products between two belt conveyors moving at different speeds, and for compensating for the difference in speed between the two conveyors. A first belt conveyor and a second belt conveyor move continuously in respective parallel opposite first and second directions, and are connected by a third belt conveyor interposed between the first and second conveyor, and which translates back and forth in the first direction or second direction.

SUMMARY OF THE INVENTION

It is an object of the present invention to provide a method and unit for feeding products to a group-forming unit, which method and unit are designed to eliminate the above drawbacks, while at the same time being cheap and easy to implement.

According to the present invention, there are provided a method and unit for feeding products to a group-forming unit, as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
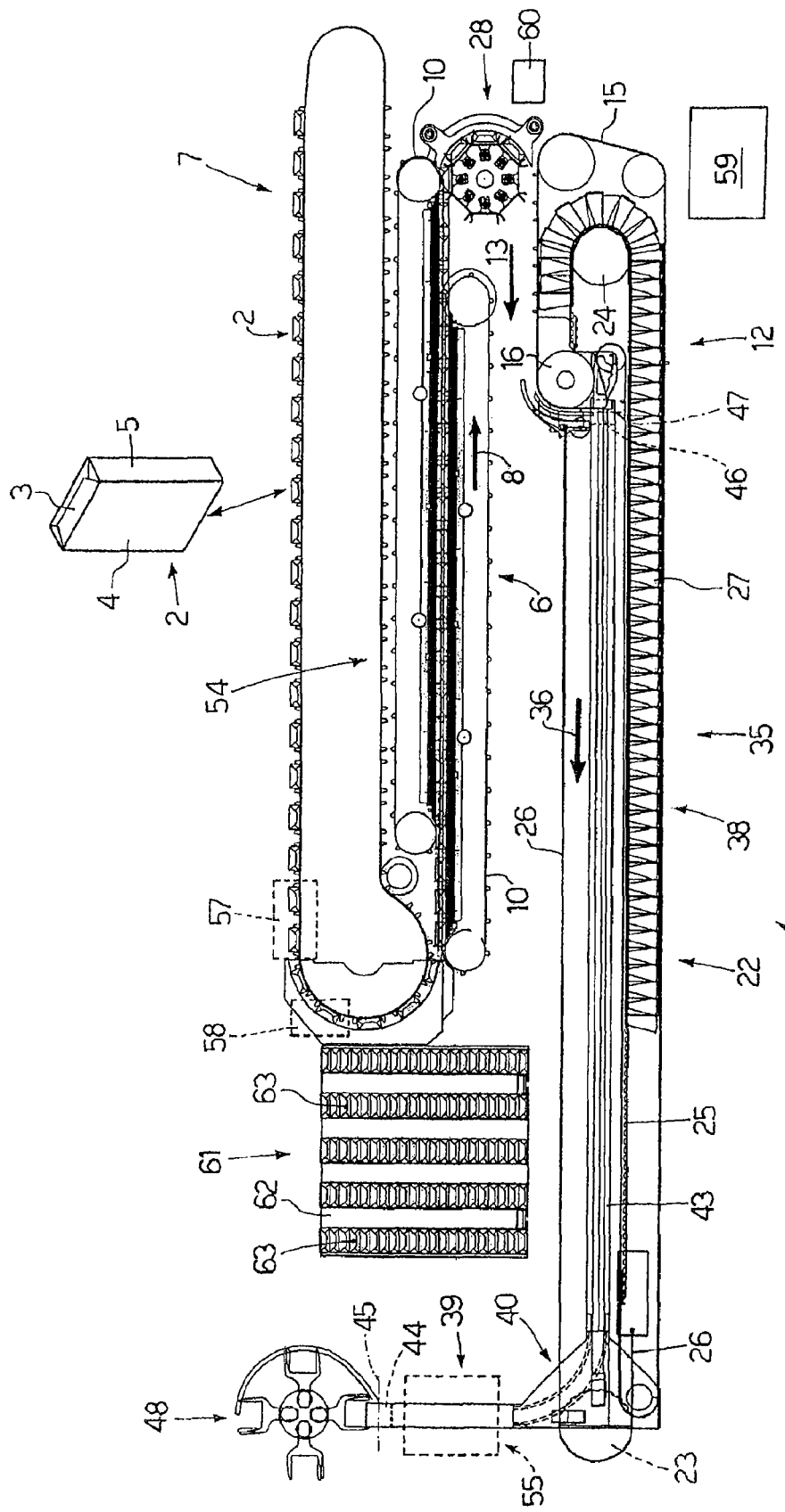
FIG. 1 shows a schematic front view, with parts removed for clarity, of a feed unit, in accordance with the present invention, for feeding packets of cigarettes from a cellophaning machine to a cartoning machine.

Number 1 in FIG. 1 indicates as a whole a feed unit for feeding packets 2 of cigarettes from a cellophaning machine to a cartoning machine comprising a group-forming unit for forming groups of packets 2 of cigarettes, each comprising a given number of (normally ten) packets 2 of cigarettes.

Each packet 2 of cigarettes has an overwrapping of heat-shrink plastic material applied by the cellophaning machine, is rectangular-parallelepiped-shaped, and comprises two parallel end walls 3 (only one shown in FIG. 1), two parallel major lateral walls 4 (only one shown in FIG. 1), and two parallel minor lateral walls 5 (only one shown in FIG. 1).

Feed unit 1 comprises a conveyor 6 which receives packets 2 of cigarettes from a heat-seal conveyor 7 of the cellophaning machine, along which the superimposed portions of the plastic overwrapping at the two end walls 3 of each packet 2 of cigarettes are heat sealed. Conveyor 6 feeds an orderly succession of packets 2 of cigarettes in a horizontal direction 8 (rightwards in FIG. 1), and comprises a succession of pockets 9, each housing a respective packet 2 of cigarettes. In a preferred embodiment shown in FIG. 1, conveyor 6 comprises two conveyor belts 10 located above and below the path of packets 2 of cigarettes to define a tunnel through which packets 2 of cigarettes travel. Each conveyor belt 10 has a number of push members 11 crosswise to direction 8 and defining pockets 9. In other words, each packet 2 of cigarettes is inserted inside a pocket 9 bounded at the rear by two push members 11 (one for each conveyor belt 10), and at the front by another two push members 11 (one for each conveyor belt 10), and each packet 2 of cigarettes is pushed in direction 8 by the two rear push members 11 (one for each conveyor belt 10).

In a preferred embodiment, the two conveyor belts 10 are identical (to reduce the number of component parts) and are offset in direction 8, so that packets 2 of cigarettes are first deposited by heat-seal conveyor 7 onto the bottom conveyor belt 10, and are only later engaged by the top conveyor belt 10. Conversely, at the end of conveyor 6, packets 2 of cigarettes leave the bottom conveyor belt 10 and are pushed in direction 8 by the top conveyor belt 10 only; in which case, conveyor 6 comprises a slide surface forming an extension of bottom conveyor belt 10, and along which packets 2 of cigarettes are pushed by top conveyor belt 10.

For easy access to the area through which packets 2 of cigarettes travel, bottom conveyor belt 10 is fixed, and top conveyor belt 10 is movable with respect to bottom conveyor belt 10 both vertically (by means of a cam which, as it rotates, lifts the end pulleys of top conveyor belt 10) and horizontally (by means of a carriage supporting the end pulleys of top conveyor belt 10).

Feed unit 1 comprises a conveyor 12 which is located beneath and parallel to conveyor 6, feeds an orderly succession of packets 2 of cigarettes in a horizontal direction 13 (leftwards in FIG. 1) opposite direction 8 of conveyor 6, and comprises a succession of pockets 14, each housing a respective packet 2 of cigarettes. In a preferred embodiment shown in FIG. 1, conveyor 12 comprises and endless conveyor belt 15 looped about an output pulley 16 mounted to move back and forth parallel to direction 13.

Conveyor 12 comprises an initial horizontal branch 17 followed by a curved end branch 18 extending 900 about output pulley 16. Along initial horizontal branch 17 of conveyor 12, packets 2 of cigarettes rest on conveyor belt 15, and, along curved end branch 18 of conveyor 12, packets 2 of cigarettes are guided about output pulley 16 by an arc-shaped rail 19 flanking output pulley 16 between an inlet and an outlet of packets 2 of cigarettes to prevent packets 2 of cigarettes from being spun out of pockets 14. Rail 19 is preferably hinged to rotate between a work position (shown in the drawings) and a maintenance position, and is maintained in the work position by a push member (e.g. an air spring).

Conveyor belt 15 has a number of push members 20 crosswise to direction 13 and defining pockets 14. In other words, each packet 2 of cigarettes is inserted inside a pocket 14 bounded at the rear by a push member 20 and at the front by another push member 20, and each packet 2 of cigarettes is pushed in direction 13 by the rear push member 20.

As stated, output pulley 16 is mounted to move back and forth parallel to direction 13. For which purpose, a carriage 21 supports output pulley 16 and is mounted to run along a rail parallel to direction 13; and an endless flexible transmission member 22 is fixed to the front and back of carriage 21 and looped about an idle pulley 23 and a powered pulley 24. Half of flexible transmission member 22 is defined by a toothed belt 25 extending about powered pulley 24 which is also toothed; and the other half is defined by a smooth cable 26 (i.e. with no teeth) extending about idle pulley 23 which is also smooth.

In a preferred embodiment, toothed belt 25 forming part of flexible transmission member 22 supports a number of U-shaped shells 27, each having a trapezoidal cross section with the minor base at toothed belt 25, and the major base opposite toothed belt 25. Shells 27 as a whole define a flexible supporting body located beneath horizontal initial branch 17 of conveyor 12 to provide adequate mechanical support of conveyor belt 15 and prevent excessive vertical deformation of conveyor belt 15 under the weight of packets 2 of cigarettes.

Moving output pulley 16 parallel to direction 13 provides for increasing or reducing the length of horizontal initial branch 17 of conveyor 12, i.e. of conveyor belt 15. More specifically, FIG. 1 shows output pulley 16 close to a rightward stop, so horizontal initial branch 17 of conveyor 12 is almost of minimum length.

Figure 2:
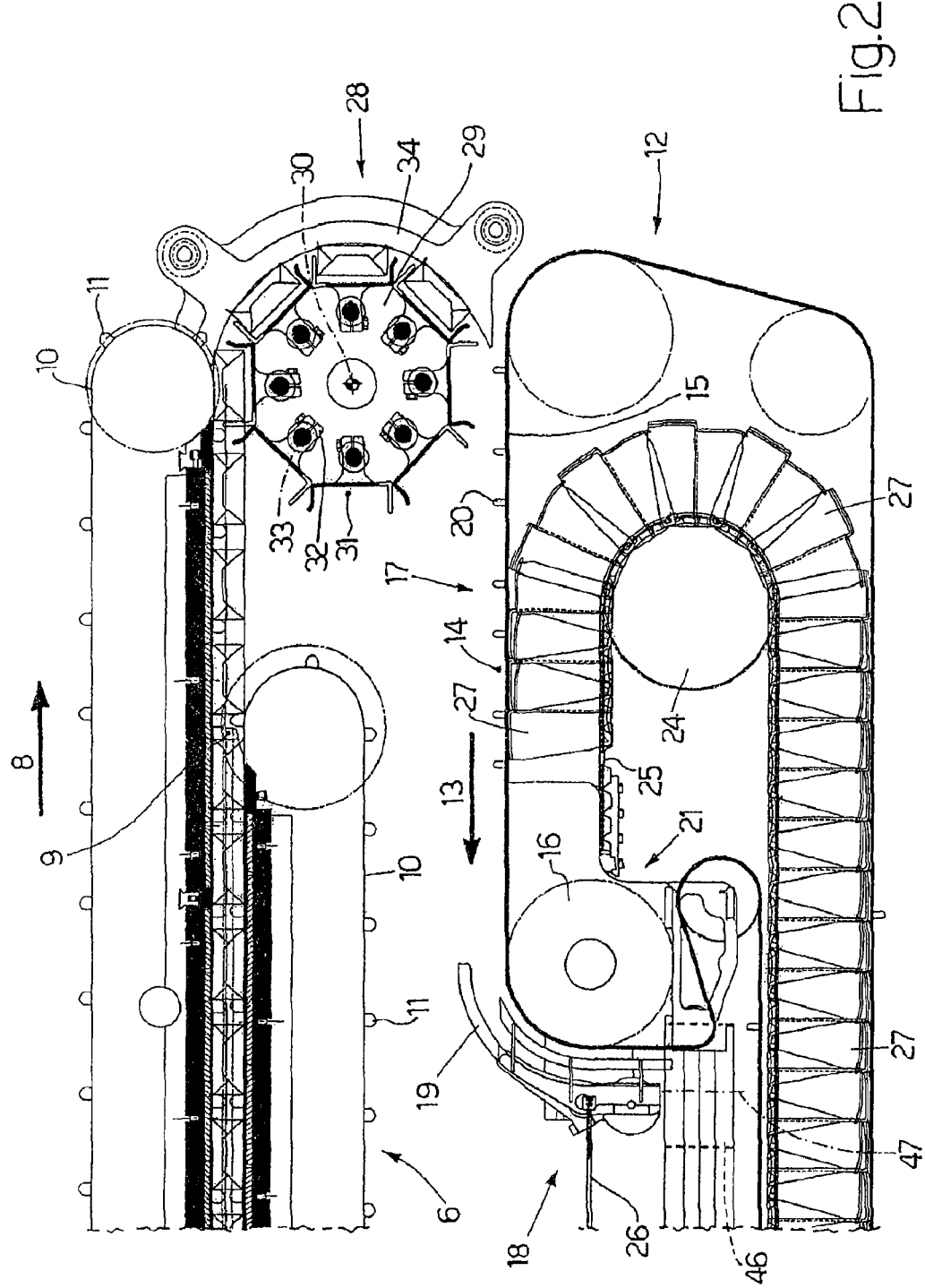
FIG. 2 shows a larger-scale front view of part of the FIG. 1 feed unit.
Figure 3:
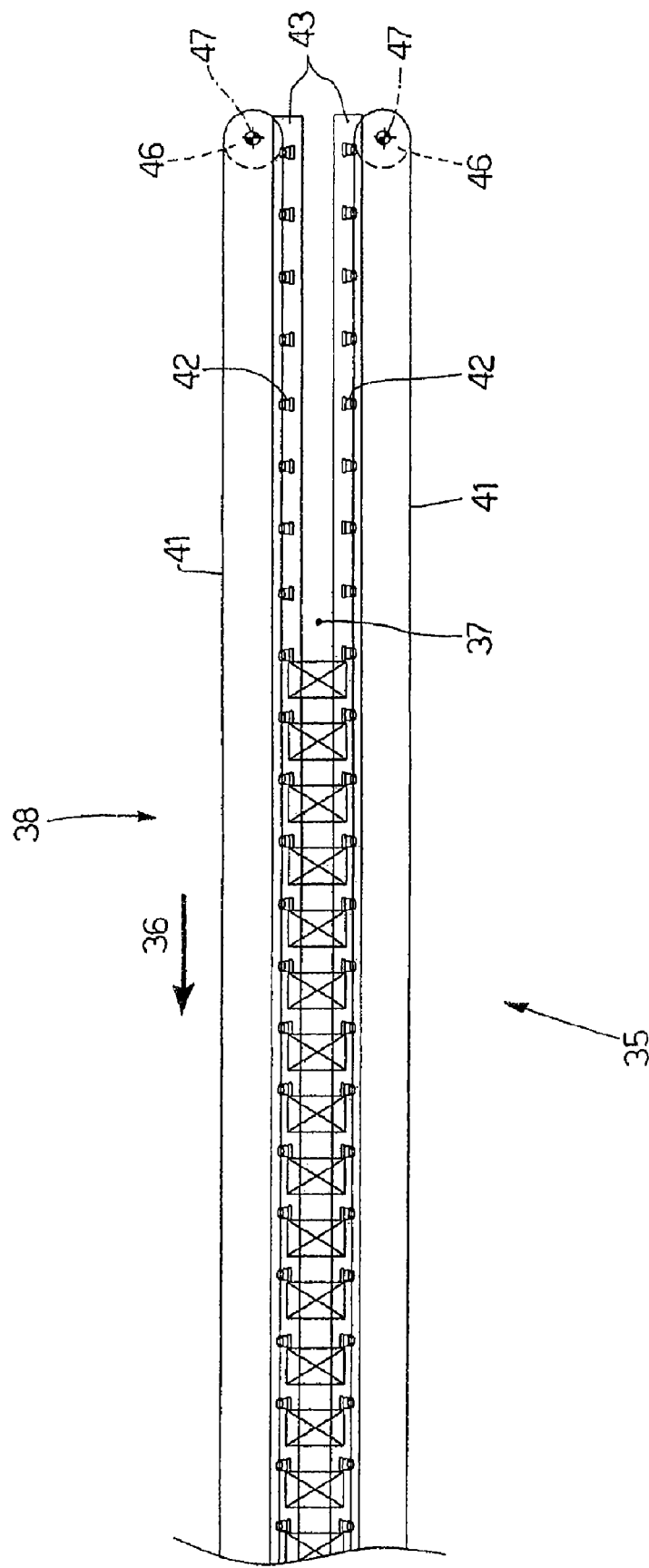
FIG. 3 shows a larger-scale plan view, with parts removed for clarity, of a conveyor of the FIG. 1 feed unit.
Figure 4:
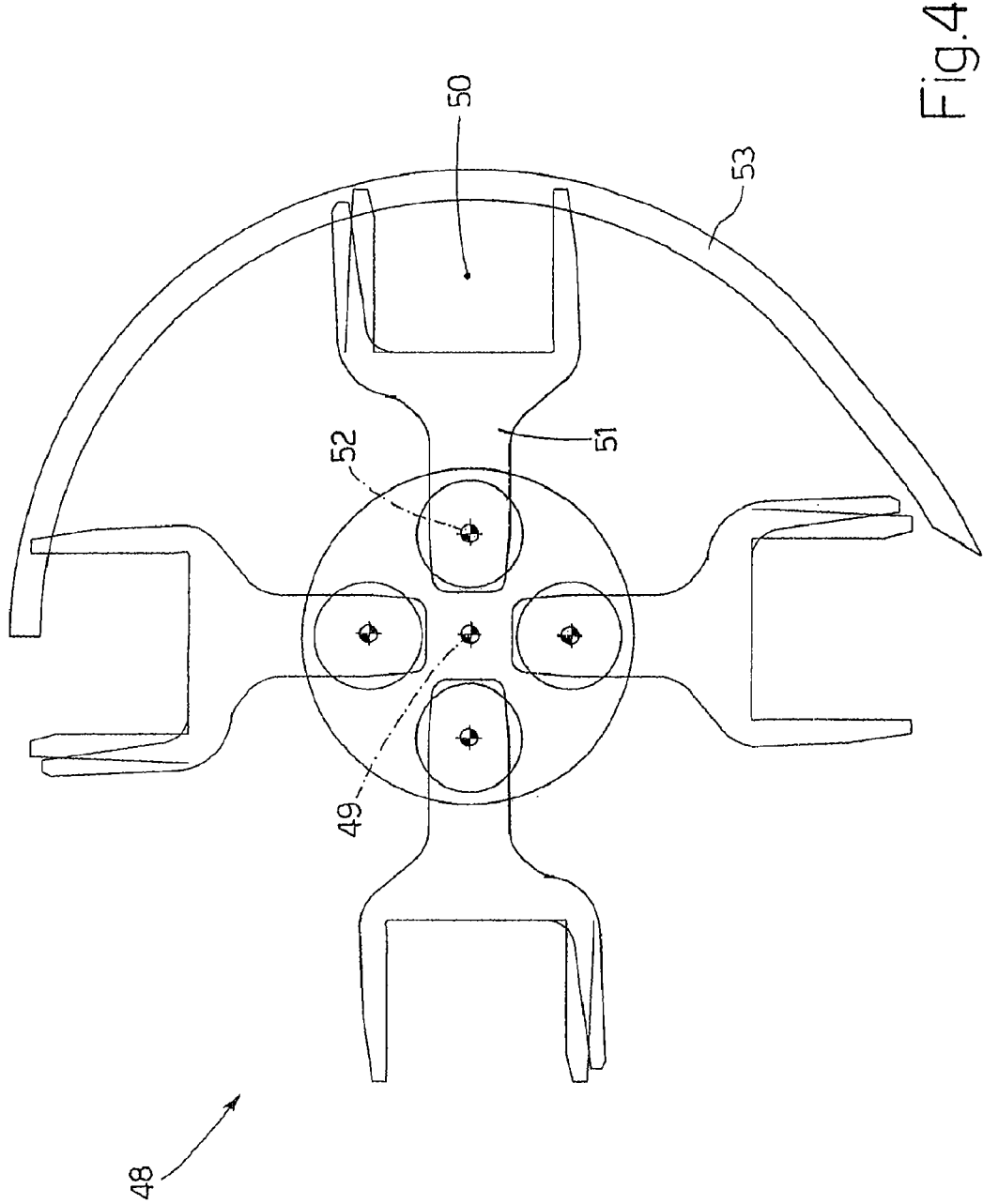
FIG. 4 shows a larger-scale front view of a transfer wheel of the FIG. 1 feed unit.
Figure 5:
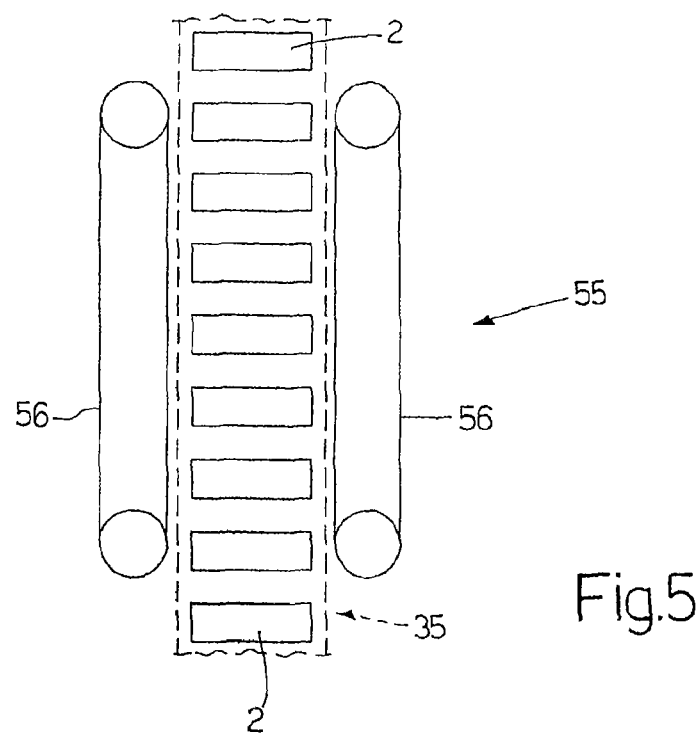
FIG. 5 shows a larger-scale front view, with parts removed for clarity, of a heat-shrink device of the FIG. 1 feed unit.
Figure 6:
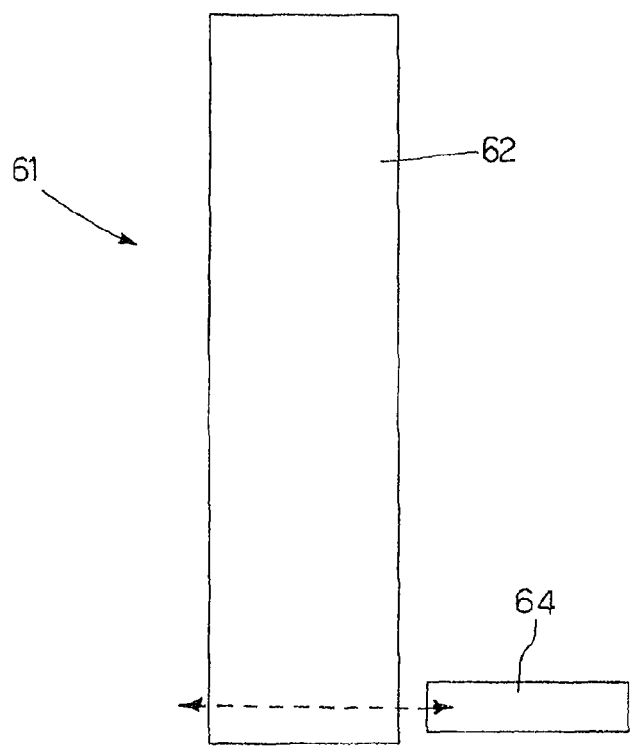
FIG. 6 shows a schematic side view of a loading device of the FIG. 1 feed unit.

As shown in FIG. 2, feed unit 1 comprises a transfer device 28 for transferring packets 2 of cigarettes from conveyor 6 to conveyor 12. Transfer device 28 comprises a wheel 29 rotating about a horizontal axis of rotation 30 perpendicular to the FIG. 2 plane, and supporting a number of pockets 31, each of which picks up a packet 2 of cigarettes from the output end of conveyor 6, and feeds packet 2 of cigarettes to the input end of conveyor 12. Each pocket 31 is fitted to an arm 32 hinged to wheel 29 to rotate with respect to wheel 29 about an axis of rotation 33 parallel to axis of rotation 30 and under the control of a cam system (not shown). Preferably, each pocket 31 comprises a gripper with two fixed jaws, i.e. a fixed distance apart; and transfer device 28 comprises an arc-shaped rail 34 flanking wheel 29 between an inlet and an outlet of packets 2 of cigarettes to prevent packets 2 of cigarettes from being spun out of pockets 31. Rail 34 is preferably hinged to rotate between a work position (shown in the drawings) and a maintenance position, and is maintained in the work position by a push member (e.g. an air spring).

As shown in FIG. 1, feed unit 1 comprises a conveyor 35 parallel to conveyor 12, and which feeds an orderly succession of packets 2 of cigarettes in a horizontal direction 36

(leftwards in FIG. 1) parallel to and in the same direction as direction 13 of conveyor 12, and comprises a succession of pockets 37, each housing a respective packet 2 of cigarettes.

In a preferred embodiment shown in FIG. 1, conveyor 35 is L-shaped with a horizontal initial branch 38 and a following vertical end branch 39 connected to each other by a curved connecting portion 40. Conveyor 35 comprises two conveyor belts 41 which are L-shaped like conveyor 35, are located side by side, and have respective numbers of push members 42 defining pockets 37. In other words, each packet 2 of cigarettes is inserted inside a pocket 37 bounded at the rear by two push members 42 (one for each conveyor belt 41), and at the front by another two push members 42 (one for each conveyor belt 41), and each packet 2 of cigarettes is pushed in direction 36 by the two rear push members 42 (one for each conveyor belt 41). Along horizontal initial branch 38 of conveyor 35 and along curved connecting portion 40, a slide surface 43 is provided, along which packets 2 of cigarettes are pushed by conveyor belts 41.

Each conveyor belt 41 extends about a top end pulley 44 rotating about a horizontal axis of rotation 45 parallel to the FIG. 1 plane, and a bottom end pulley 46 rotating about a vertical axis of rotation 47 perpendicular to axis of rotation 45. Since each conveyor belt 41, to wind about top end pulley 44 and bottom end pulley 46, must be able to rotate about two perpendicular axes, conveyor belt 41 is defined by a number of links hinged to one another to rotate with respect to one another about two perpendicular axes. For each conveyor belt 41, one pulley 44 or 46 is idle, and the other pulley 46 or 44 is powered to move conveyor belt 41.

As shown in FIG. 1, the horizontal initial branch 38 of conveyor 35 is aligned vertically with and located beneath conveyor 12, so that conveyor 12 deposits packets 2 of cigarettes inside respective pockets 37 of conveyor 35. In other words, curved end branch 18 of conveyor 12 terminates directly over horizontal initial branch 38 of conveyor 35, so that each packet 2 of cigarettes coming off conveyor 12 is inserted inside a respective pocket 37 of conveyor 35. Output pulley 16 of conveyor 12 therefore constitutes a transfer device for transferring packets 2 of cigarettes from pockets 14 of conveyor 12 to pockets 37 of conveyor 35.

As stated, moving output pulley 16 parallel to direction 13 (i.e. parallel to direction 36) provides for increasing or reducing the length of horizontal initial branch 17 of conveyor 12, i.e. of conveyor belt 15. In other words, the length of initial branch 17 of conveyor belt 15 is physically altered by moving output pulley 16 parallel to direction 13 (i.e. parallel to direction 36). Similarly, moving output pulley 16 parallel to direction 13 (i.e. parallel to direction 36) provides for increasing or reducing the length of horizontal initial branch 38 of conveyor 35, by altering the position in which packets 2 of cigarettes are fed into pockets 37 of conveyor 35. In other words, moving output pulley 16 parallel to direction 13 (i.e. parallel to direction 36) alters the size of the portion of horizontal initial branch 38 of conveyor 35 actually involving packets 2 of cigarettes, as opposed to physically altering the length of horizontal initial branch 38 of conveyor 35.

Packets 2 of cigarettes are released from conveyor 35 to the cartoning machine group-forming unit, which forms groups of packets 2 of cigarettes, each comprising a given number of (normally ten) packets 2 of cigarettes. As shown in FIG. 1, the group-forming unit of the cartoning machine comprises a transfer wheel 48 rotating about a horizontal axis of rotation 49 perpendicular to the FIG. 1 plane, and supporting a number of pockets 50, each of which picks up a pair of superimposed packets 2 of cigarettes off the output end of conveyor 35, and feeds the pair of superimposed packets 2 of cigarettes to a further horizontal conveyor which compacts the pairs of superimposed packets 2 of cigarettes into groups of packets 2 of cigarettes.

Each pocket 50 is fitted to an arm 51 hinged to transfer wheel 48 to rotate with respect to transfer wheel 48 about an axis of rotation 52 parallel to axis of rotation 30, and under the control of a cam system (not shown). Preferably, each pocket 50 is defined by a gripper with two jaws; and transfer wheel 48 is fitted with an arc-shaped rail 53 flanking transfer wheel 48 between an inlet and an outlet of packets 2 of cigarettes to prevent packets 2 of cigarettes from being spun out of pockets 50. Rail 53 is preferably hinged to rotate between a work position (shown in the drawings) and a maintenance position, and is maintained in the work position by a push member (e.g. an air spring).

As shown in FIG. 1, it is important to note that packets 2 of cigarettes are housed inside pockets 9 of conveyor 6 in a first position with respect to direction 8 (i.e. are laid flat), are housed inside pockets 14 of conveyor 12 in the first position with respect to direction 13 (i.e. are laid flat), and are housed inside pockets 37 of conveyor 35 in a second position with respect to direction 36 (i.e. are positioned on edge). More specifically, in the first position, the major lateral walls 4 of each packet 2 of cigarettes are parallel to direction 8, 13, and the minor lateral walls 5 are perpendicular to direction 8, 13; and, in the second position, the major lateral walls 4 of each packet 2 of cigarettes are perpendicular to direction 36, and the minor lateral walls 5 are parallel to direction 36. The change in the position of packets 2 of cigarettes is made by output pulley 16 rotating each packet 2 of cigarettes 900 about its central axis of symmetry.

As shown in FIG. 1, a heat-shrink device 54 subjects each packet 2 of cigarettes to a first heat-shrink operation along conveyor 6; and a further heat-shrink device 55 subjects each packet 2 of cigarettes to a second heat-shrink operation along vertical end branch 39 of conveyor 35. By virtue of the change in position of packets 2 of cigarettes, heat-shrink device 54 heats major lateral walls 4 of each packet 2 of cigarettes, and heat-shrink device 55 heats minor lateral walls 5 of each packet 2 of cigarettes, thus effectively smoothing out the whole lateral surface and achieving a high-quality finish of the heat-shrink plastic overwrapping of each packet 2 of cigarettes.

Heat-shrink device 54 is defined by the two conveyor belts 10, each of which has a metal belt which rests on a major lateral wall 4 of each packet 2 of cigarettes and is heated by conduction by an electric heater with heating resistors.

Heat-shrink device 55 is defined by two conveyor belts 56 located on opposite sides of vertical end branch 39 of conveyor 35 to form a tunnel through which packets 2 of cigarettes travel; and each conveyor belt 56 has a metal belt which rests on a minor lateral wall 5 of each packet 2 of cigarettes and is heated by conduction by an electric heater with heating resistors. For easy access to the area in which packets 2 of cigarettes travel, each conveyor belt 56 is movable with respect to conveyor 35 in two perpendicular horizontal directions.

As shown in FIG. 1, along cellophaning machine heat-seal conveyor 7, a control station 57 with optical sensors controls the overwrapping quality of each packet 2 of cigarettes; and, downstream from control station 57, a reject station 58 is provided where any faulty packets 2 of cigarettes (i.e. with flawed overwrappings) are expelled from heat-seal conveyor 7. More specifically, reject station 58 comprises a conveyor belt positioned crosswise and obliquely with respect to heat-seal conveyor 7, and supporting a number of teeth; and, when the conveyor belt of reject station 58 is moved forward one step, a tooth moves through heat-seal conveyor 7 to push a packet 2 of cigarettes off heat-seal conveyor 7.

As shown in FIG. 1, a control device 59 supervises operation of feed unit 1, and is connected to an optical sensor 60 for detecting the presence of an empty pocket 31 (i.e. a gap) on transfer device 28. In an equivalent embodiment, optical sensor 60 may be located upstream from transfer device 28, along conveyor 6, or downstream from transfer device, along conveyor 12. It is important to note that, from the operating standpoint, the location of optical sensor 60 is unimportant, in that a gap along conveyor 6 is automatically and predictably transmitted to transfer device 28 and hence conveyor 12. The actual location of optical sensor 60 therefore depends solely on the restrictions posed by the size of optical sensor 60, and the desired amount of advance warning of the gap.

Feed unit 1 comprises a first drive controlled by control device 59 and for powering conveyor 6, conveyor 12, and transfer device 28; a second drive controlled by control device 59 and for powering flexible member 22 to move output pulley 16; and a third drive controlled by control device 59 and for powering conveyor 35.

Operation of feed unit 1 as described above will now be described with particular reference to FIG. 1.

In normal operating conditions of feed unit 1, the number of packets 2 of cigarettes produced on the cellophaning machine equals the number of packets 2 of cigarettes absorbed by the cartoning machine, so there are no empty pockets 9 (i.e. gaps) along conveyor 6, and output pulley 16 of conveyor 12 remains in a fixed position (i.e. is not translated), and transfers packets 2 of cigarettes from conveyor 12 to conveyor 35, filling all the pockets 37 on conveyor 35.

Upon detection of an empty pocket 31 (i.e. a gap) on transfer device 28 and later along conveyor 12, control device 59 shifts output pulley 16 of conveyor 12 parallel to direction 13 and towards conveyor 35 (i.e. away from transfer device 28 and leftwards in FIG. 1), while keeping output pulley 16 in time with conveyors 12 and 35 to transfer packets 2 of cigarettes from pockets 14 of conveyor 12 to pockets 37 of conveyor 35, and fill all of pockets 37. The gap on transfer device 28 and later on conveyor 12 is thus eliminated, so conveyor 35 has no gaps (i.e. empty pockets 37). In the event of a number of consecutive gaps along conveyor 12 (i.e. on transfer device 28), output pulley 16 of conveyor 12 is moved consecutively towards conveyor 35 to cover all the consecutive gaps.

Obviously, the above strategy of eliminating gaps along conveyor 12 (i.e. on transfer device 28) applies until output pulley 16 of conveyor 12 reaches a stop at vertical branch 39 of conveyor 35. As output pulley 16 nears the stop at vertical branch 39 of conveyor 35, control device 59 stops conveyor 35, stops conveyors 12, 6 and transfer device 28 one after the other, and arrests translation of output pulley 16 in time with the cartoning machine group-forming unit to allow the group-forming unit to complete the last carton being formed, and so allow the cartoning machine to make a so-called "carton skip", i.e. cut off packing material supply and perform a no-load cycle to avoid producing rejects.

Alternatively, as output pulley 16 nears the stop at vertical branch 39 of conveyor 35, control device 59 controls feed unit 1 to form, along conveyor 35, a number of gaps equal to a multiple of the number of packets 2 of cigarettes in each group of packets 2 of cigarettes, thus enabling the cartoning machine, on receiving a number of gaps equal to the number of packets 2 of cigarettes in each group of packets 2 of cigarettes, to make a "carton skip", i.e. cut off packing material supply and perform a no-load cycle to avoid producing rejects. In other words, when the gaps along conveyor 12 (i.e. on transfer device 28) can no longer be compensated, the uncompensated gaps are transferred successively to conveyor 35 so they always equal a multiple of the number of packets 2 of cigarettes in each group of packets 2 of cigarettes, thus enabling the cartoning machine to make even repeated "carton skips" to avoid producing rejects.

On nearing the stop at vertical branch 39 of conveyor 35, output pulley 16 of conveyor 12 can be moved into an intermediate position between its two stops by moving it, parallel to direction 13, from conveyor 35 towards transfer device 28, so as to form, along conveyor 35, a number of consecutive empty pockets 37 (gaps) equal to the number of packets 2 of cigarettes in each group of packets 2 of cigarettes. In which case, the cartoning machine again makes a "carton skip" to avoid producing rejects. In this case too, to avoid forming gaps (i.e. empty pockets 37) along conveyor 35, conveyor 35 may be stopped in time with the cartoning machine group-forming unit to allow the group-forming unit to complete the last carton being formed.

In the event of stoppage of the cellophaning machine or cartoning machine, the cartoning machine or cellophaning machine is also stopped automatically; in which case, feed unit 1 is controlled by control device 59 in an attempt to avoid forming incomplete groups of packets 2 of cigarettes in the cartoning machine group-forming unit, or leaving stationary packets 2 of cigarettes inside heat-shrink devices 54 and 55. Heat-shrink devices 54 and 55, in fact, are designed to heat packets 2 of cigarettes for at most a few seconds. So, if a packet of cigarettes 2 is left inside heat-shrink device 54 or 55 for longer than this, the overwrapping of packet 2 of cigarettes is irreparably damaged by overheating.

In a preferred embodiment shown in FIG. 1, feed unit 1 comprises a loading device 61 for loading pockets 14 of conveyor 12 with a number of packets 2 of cigarettes inside a removable magazine 62. The function of loading device 61 is to feed back into the packing cycle any cellophane-wrapped packets 2 of cigarettes previously removed from the packing cycle, but with no flaws. For example, in the event a carton is rejected, the packets 2 of cigarettes in the carton have no flaws, and can therefore be fed back into the packing cycle.

Magazine 62 has five vertical channels 63, each housing a stack of packets 2 of cigarettes, which move down vertical channel 63 by gravity; and loading device 61 comprises a push device 64 with five pushers, each of which moves through a vertical channel 63 to push the last (i.e. bottom) packet 2 of cigarettes in the stack out of vertical channel 63 and into a respective pocket of conveyor 12.

To empty magazine 62, at least five consecutive gaps (i.e. empty pockets 14) are formed along conveyor 12, and output pulley 16 of conveyor 12 is moved into position close to the stop at vertical branch 39 of conveyor 35 (so that horizontal branch 17 of conveyor 12 is positioned opposite loading device 61); and push device 64 is moved back and forth to transfer five packets 2 of cigarettes from vertical channels 63 of magazine 62 into five empty pockets 14 of conveyor 12.

Loading device 61 has numerous advantages, by effectively feeding back into the packing cycle, with no assistance whatsoever on the part of the operator, any cellophane-wrapped packets 2 of cigarettes previously removed from the packing cycle but with no flaws, thus making recovery of such packets 2 of cigarettes economically feasible.

Feed unit 1 as described above has numerous advantages: it is fairly straightforward mechanically; allows easy access to all the areas through which packets 2 of cigarettes travel; allows optimum location of heat-shrink devices 54, 55 necessary to obtain high-quality plastic overwrappings of packets 2 of cigarettes; and effectively handles sharp deceleration (or stoppage) of the cartoning machine without producing reject packets 2 of cigarettes.

The invention claimed is:

1. A method of feeding products to a group-forming unit for forming groups of products, each comprising a given number of products; the method comprising the steps of:

feeding an orderly succession of products in a first direction by means of a first conveyor having a succession of first pockets, each housing a respective product;

feeding an orderly succession of products in a second direction, parallel and same direction to the first direction, by means of a second conveyor parallel to the first conveyor and having a succession of second pockets, each housing a respective product;

transferring the products from the first conveyor to the second conveyor by means of a transfer device;

detecting a gap along the first conveyor;

moving the transfer device in the second direction, in response to detecting a gap along the first conveyor;

moving the transfer device in the opposite direction to the second direction to form, along the second conveyor, a number of consecutive gaps equal to the number of products in each group of products; and making the transfer device stationary and permanently integral with an output end of the first conveyor, so as to move the transfer device together with the output end of the first conveyor, both in the second direction and in the opposite direction to the second direction, and thus moving the output end of the first conveyor with respect to the second conveyor.

2. A method as claimed in claim 1, wherein the first conveyor comprises an endless conveyor belt looped about an output pulley, which is movable parallel to the first direction and defines the transfer device.

3. A method as claimed in claim 1, and comprising the further steps of:

positioning the products inside the first pockets of the first conveyor in a first position with respect to the first direction;

altering the position of the products by means of the transfer device; and positioning the products inside the second pockets of the second conveyor in a second position with respect to the second direction.

4. A method as claimed in claim 3, wherein each product is rectangular-parallelepiped-shaped, and comprises two parallel end walls, two parallel major lateral walls, and two parallel minor lateral walls; in the first position, the major lateral walls being parallel to the first direction, and the minor lateral walls being perpendicular to the first direction; and, in the second position, the major lateral walls being perpendicular to the second direction, and the minor lateral walls being parallel to the second direction.

5. A method as claimed in claim 3, wherein each product is a packet with an overwrapping of heat-shrink plastic material; the method comprising the further steps of:

subjecting each product to a first heat-shrink operation upstream from the first conveyor and by means of a first heat-shrink device; and subjecting each product to a second heat-shrink operation along the second conveyor and by means of a second heat-shrink device.

\* \* \* \* \*